(12) United States Patent
Paulus

(10) Patent No.: US 11,222,754 B2
(45) Date of Patent: Jan. 11, 2022

(54) SOLID ELECTROLYTIC CAPACITOR FOR A TANTALUM EMBEDDED MICROCHIP

(71) Applicant: AVX Corporation, Fountain Inn, SC (US)

(72) Inventor: Joseph W. Paulus, Portland, ME (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 19 days.

(21) Appl. No.: 16/662,560

(22) Filed: Oct. 24, 2019

(65) Prior Publication Data

US 2020/0161059 A1 May 21, 2020

Related U.S. Application Data

(60) Provisional application No. 62/769,084, filed on Nov. 19, 2018.

(51) Int. Cl.
| | |
|---|---|
| *H01G 9/15* | (2006.01) |
| *H01G 9/052* | (2006.01) |
| *H01G 9/012* | (2006.01) |
| *H01G 9/00* | (2006.01) |
| H01G 9/08 | (2006.01) |
| H01G 9/042 | (2006.01) |
| H01G 9/07 | (2006.01) |

(52) U.S. Cl.
CPC ......... *H01G 9/0525* (2013.01); *H01G 9/0029* (2013.01); *H01G 9/012* (2013.01); *H01G 9/15* (2013.01); *H01G 9/042* (2013.01); *H01G 9/07* (2013.01); *H01G 9/08* (2013.01)

(58) Field of Classification Search
CPC .... H01G 9/0525; H01G 9/0029; H01G 9/012; H01G 9/15; H01G 9/042; H01G 9/07; H01G 9/08
See application file for complete search history.

(56) References Cited

U.S. PATENT DOCUMENTS

| | | |
|---|---|---|
| 3,345,545 A | 10/1967 | Bourgault et al. |
| 3,889,357 A * | 6/1975 | Millard ............... H01G 9/0029 29/25.03 |

(Continued)

FOREIGN PATENT DOCUMENTS

| | | |
|---|---|---|
| JP | 2000150305 A | 5/2000 |
| KR | 20080108662 A | 12/2008 |
| KR | 20120051170 A | 5/2012 |

*Primary Examiner* — Dion R. Ferguson
(74) *Attorney, Agent, or Firm* — Dority & Manning, P.A.

(57) ABSTRACT

A solid electrolytic capacitor and method for making the capacitor are provided. The capacitor includes a sintered porous anode body formed from a valve metal, a metallic physical vapor deposition (PVD) layer disposed directly on a planar surface of the anode body, a dielectric, a cathode, and anode and cathode terminations. The dielectric overlies at least a portion of the anode body and is also formed within the anode body. The cathode overlies at least a portion of the dielectric that overlies the anode body and includes a solid electrolyte, and a portion of a lower surface of the metallic PVD layer is free of both the dielectric and solid electrolyte. The anode termination is electrically connected to the portion of the lower surface of the metallic PVD layer that is free of both the dielectric and solid electrolyte, and the cathode termination is electrically connected to the solid electrolyte.

21 Claims, 7 Drawing Sheets

(56) References Cited

U.S. PATENT DOCUMENTS

| | | | |
|---|---|---|---|
| 4,164,005 A * | 8/1979 | Cheseldine | H01G 9/012 |
| | | | 361/540 |
| 4,761,714 A | 8/1988 | Levasseur et al. | |
| 4,945,452 A | 7/1990 | Sturmer et al. | |
| 5,357,399 A | 10/1994 | Salisbury | |
| 5,469,325 A * | 11/1995 | Evans | H01G 9/00 |
| | | | 361/517 |
| 5,812,366 A * | 9/1998 | Kuriyama | H01G 9/15 |
| | | | 361/523 |
| 5,949,639 A | 9/1999 | Maeda et al. | |
| 6,191,936 B1 | 2/2001 | Webber et al. | |
| 6,197,252 B1 | 3/2001 | Bishop et al. | |
| 6,351,371 B1 | 2/2002 | Yoshida et al. | |
| 6,643,121 B1 | 11/2003 | Huntington | |
| 6,673,389 B1 | 1/2004 | Huntington | |
| 6,699,767 B1 | 3/2004 | Huntington | |
| 6,751,085 B1 | 6/2004 | Huntington | |
| 6,813,140 B1 * | 11/2004 | Huntington | H01G 9/15 |
| | | | 361/528 |
| 6,849,292 B1 | 2/2005 | Huntington | |
| 7,116,548 B2 | 10/2006 | Satterfield, Jr. et al. | |
| 7,262,511 B2 | 8/2007 | Osako et al. | |
| 7,323,395 B2 | 1/2008 | Huntington | |
| 7,515,396 B2 | 4/2009 | Biler | |
| 7,687,884 B2 | 3/2010 | Huntington | |
| 7,745,281 B2 | 6/2010 | Prymak et al. | |
| 8,218,292 B2 | 7/2012 | Rezai-Kalantary | |
| 9,966,196 B2 | 5/2018 | Paulus et al. | |
| 2005/0111164 A1 | 5/2005 | Huntington | |
| 2005/0270725 A1 | 12/2005 | Hahn et al. | |
| 2006/0038304 A1 | 2/2006 | Osako et al. | |
| 2006/0087795 A1 * | 4/2006 | Nagasawa | H01G 9/008 |
| | | | 361/306.3 |
| 2007/0127191 A1 * | 6/2007 | Kuriyama | H01G 9/08 |
| | | | 361/535 |
| 2007/0253147 A1 | 11/2007 | Marek et al. | |
| 2008/0030922 A1 | 2/2008 | Hidaka et al. | |
| 2008/0198535 A1 * | 8/2008 | Kuriyama | H01G 9/052 |
| | | | 361/528 |
| 2008/0232037 A1 | 9/2008 | Biler | |
| 2008/0291606 A1 * | 11/2008 | Takahashi | H01G 9/15 |
| | | | 361/535 |
| 2016/0284476 A1 * | 9/2016 | Paulus | H01G 9/07 |
| 2017/0287647 A1 * | 10/2017 | Nobuta | H01G 9/012 |
| 2018/0047517 A1 * | 2/2018 | Kanryo | H01G 9/0032 |
| 2019/0252127 A1 | 8/2019 | Paulus et al. | |
| 2019/0355526 A1 * | 11/2019 | Yokokura | H01G 9/012 |
| 2020/0219662 A1 * | 7/2020 | Yokokura | H01G 9/04 |

* cited by examiner

SOLID ELECTROLYTIC CAPACITOR FOR A TANTALUM EMBEDDED MICROCHIP

CROSS REFERENCE TO RELATED APPLICATIONS

The present application claims the benefit of U.S. Provisional Application Ser. No. 62/769,084 having a filing date of Nov. 19, 2018, which is incorporated herein by reference for all purposes.

BACKGROUND OF THE INVENTION

Solid electrolytic capacitors (e.g., tantalum capacitors) have been a major contributor to the miniaturization of electronic circuits and have made possible the application of such circuits in extreme environments. An example of a solid state capacitor and related mass production method for manufacturing surface mountable solid state capacitors is disclosed in U.S. Pat. No. 5,357,399 to Salisbury.

Some solid electrolytic capacitors have an anode lead formed of a substantially planar surface that is bonded to an anode body with a seed/seeding layer. Seed layers, and sometimes the anode bodies as well, have been formed as respective continuous planes of material that are cut in multiple dimensions to provide discrete capacitor elements. For example, U.S. Pat. No. 6,699,767 to Huntington discloses a method for manufacturing multiple solid state capacitors that includes steps for forming such seed and anode components. An entire upper surface of a wafer has sintered thereon a seed layer, for example a dispersion of tantalum powder. A green (i.e. un-sintered) mixture of fine-grained capacitor grade tantalum powder is then pressed onto the upper surface of the substrate to form a green layer. The green layer is sintered to fuse the fine grained powder into an integral porous network. The sintering process also fuses the porous layer to the coarse seeding layer. The substrate assembly is then machined to produce an orthogonal grid of transverse channels and longitudinal channels, which are cut to a depth just beyond the level of the porous tantalum layer so that the cuts impinge on the substrate. The machining process produces an array of orthogonal section bodies, on the substrate, which are ultimately processed to form the anode portions of the capacitors.

In a related variation to the above manufacturing process, a continuous plane of material forming a seed layer is formed over the substrate and sintered. Subsequently, anodes of the same or varying heights are matrix pressed onto the seeded wafer. After pressing, the anodes are sintered. A series of orthogonal cuts must still be performed through the seed layer slightly into the wafer to remove the seed from between respective anode layer bodies and form discrete capacitor elements.

The multiple steps for forming discrete capacitor elements, especially the cutting steps in U.S. Pat. No. 6,669,767 to Huntington to produce the transverse and longitudinal channels, can be a time-consuming and expensive part of the manufacturing process. In addition, generally thicker substrates are required so that the channels can be cut into the substrate beyond the level of the porous tantalum layer thereon, thus limiting potential volumetric efficiency of the capacitor elements.

Meanwhile, other capacitor elements require the use of an embedded anode lead wire that extends from a surface of the anode body or an anode lead wire that is welded to a surface of the anode body, where both types of capacitor elements have their own disadvantages. In particular, the anode lead wire reduces the volumetric efficiency of the resulting capacitor. Further, with an embedded anode lead wire, a higher sintering temperature is required to ensure that the anode lead wire is adequately bonded to the anode body. In addition, with a welded anode lead wire, the area of weld contact can be relatively small, so all of the weld energy is expended in a small area which results in deep penetration of the anode lead wire and weld zone into the anode body in order to achieve sufficient weld strength, and significant damage can occur in the weld area when high specific charge particles are utilized to form a thin porous anode body.

In addition, some capacitor elements contemplate the use of a welded anode foil or the use of two anode pellets having varying press densities to achieved impermeability and/or hermeticity. However, the processes to form such capacitor elements is time consuming and tedious. Further, in some instances, the capacitor elements can be damaged during welding or removal of extraneous portions of the anode foil in the case of a capacitor element including a welded anode foil.

As such, a need currently exists for an improved capacitor element having a decreased height profile and increased volumetric efficiency that can be produced in a simplified, more cost-efficient process.

SUMMARY OF THE INVENTION

In accordance with one exemplary embodiment of the present invention, a solid electrolytic capacitor includes a sintered porous anode body containing a valve metal, a metallic physical vapor deposition (PVD) layer, a dielectric, a cathode, and anode and cathode terminations. The metallic PVD layer is disposed directly on a planar surface of the porous anode body. Further, the dielectric overlies at least a portion of the porous anode body, and the dielectric is also formed within the porous anode body. In addition, the cathode overlies at least a portion of the dielectric that overlies the porous anode body and includes a solid electrolyte, where at least a portion of a lower surface of the metallic PVD layer is free of the dielectric and the solid electrolyte. Additionally, the anode termination is electrically connected to the portion of the lower surface of the metallic PVD layer that is free of the dielectric and the solid electrolyte, and the cathode termination is electrically connected to the solid electrolyte. Further, the metallic PVD layer is impermeable to liquids.

In accordance with one exemplary embodiment of the present invention, a method of forming a solid electrolytic capacitor includes forming a porous anode body from a powder, where the powder is formed from a valve metal. The method also includes sintering the porous anode body and sputtering a metallic PVD layer directly onto a planar surface of the porous anode body, either before or after sintering the porous anode body. In addition, the method includes anodically oxidizing at least a portion of the sintered porous anode body to form a dielectric that overlies at least a portion of the sintered porous anode body, where the dielectric is also formed within the sintered porous anode body, and applying a solid electrolyte to at least a portion of the anodically oxidized sintered porous anode body. Further, at least a portion of a lower surface of the metallic PVD layer is free of the dielectric and the solid electrolyte. Moreover, the method includes electrically connecting the portion of the lower surface of the metallic PVD layer that is free of the dielectric and the solid electrolyte to an anode termination and electrically connecting the solid electrolyte to a cathode termination.

Other features and aspects of the present invention are set forth in greater detail below.

BRIEF DESCRIPTION OF THE DRAWINGS

A full and enabling disclosure of the present invention to one skilled in the art, including the best mode thereof, is set forth more particularly in the remainder of the specification, including reference to the accompanying figures, in which.

Figure 1A:
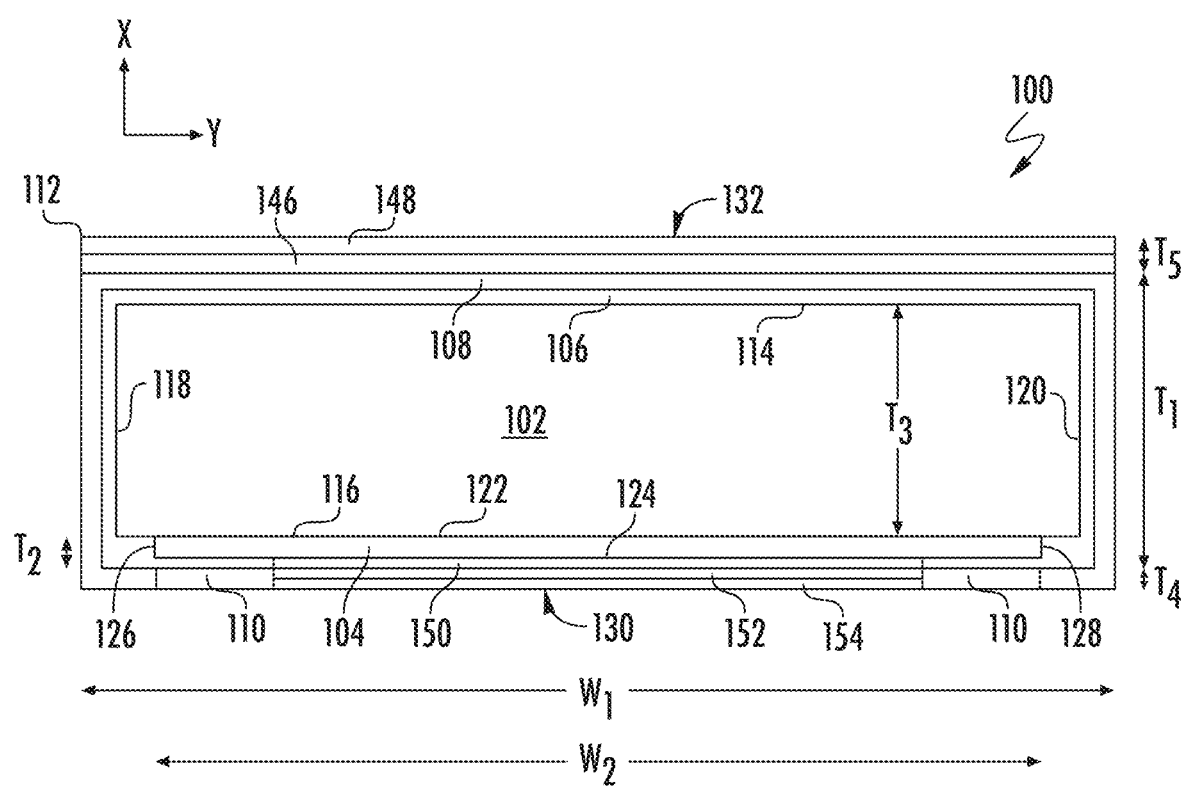
FIG. 1A is a cross-sectional view of a solid electrolytic capacitor in accordance with one embodiment of the present invention, where the solid electrolytic capacitor includes a two electrode configuration where an anode termination and a cathode termination are positioned on opposing sides of the solid electrolytic capacitor.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a solid electrolytic capacitor and a method for making such a capacitor. The capacitor includes a porous anode body that includes a valve metal, a metallic physical vapor deposition (PVD) layer, a dielectric, a cathode, and anode and cathode terminations. The metallic PVD layer is disposed directly on a planar surface of the porous anode body. For instance, an upper surface of the metallic PVD layer can be in direct contact with a lower surface of the porous anode body such that no seed layer, anode substrate, anode foil, or increased press density anode pellet, or the like is disposed between the porous anode body and the metallic PVD layer. Further, the dielectric overlies at least a portion of the porous anode body, and the dielectric is also formed within at least a portion of the porous anode body. The cathode overlies at least a portion of the dielectric that overlies the porous anode body and includes a solid electrolyte. Moreover, at least a portion of the lower surface of the metallic PVD layer is free of both the dielectric and the solid electrolyte. In addition, the anode termination is electrically connected to the portion of the lower surface of the metallic PVD layer that is free of both the dielectric and the solid electrolyte, and the cathode termination is electrically connected to the solid electrolyte. Further, the metallic PVD layer can be impermeable to liquids so that its lower surface is free of the dielectric and the solid electrolyte, thus enabling connection to an anode termination without requiring an anode lead wire, which allows for increased volumetric efficiency and permits anode-cathode isolation without the need for cumbersome mechanical processing.

Specifically, the present inventors have found that by sputtering a metallic physical vapor deposition (PVD) layer directly onto a planar surface of porous anode body, either before or after sintering the porous anode body, where the metallic PVD layer is impermeable to liquids, the cathode layer cannot penetrate from the upper surface of the PVD anode layer to the lower surface of the metallic PVD layer to contact the anode termination, where such contact could result in a short circuit during use of the resulting capacitor. In addition, the metallic PVD layer simplifies the production process and enables the formation of a volumetrically efficient capacitor having a lower height profile or thickness compared to capacitors that utilize an anode lead wire.

Various embodiments of the present invention will now be described in more detail.

I. Anode Component

The porous anode body of the anode component can be formed from a valve metal composition containing a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In one particularly suitable embodiment, the valve metal composition contains tantalum.

The valve metal composition can have a specific charge ranging from about 10,000 μF*V/g to about 500,000 μF*V/g, in some embodiments about 15,000 μF*V/g to about 400,000 µF*V/g, in some embodiments from about 20,000 µF*V/g to about 250,000 µF*V/g, in some embodiments from about 25,000 µF*V/g to about 125,000 µF*V/g. As is known in the art, the specific charge may be determined by multiplying capacitance by the anodizing voltage employed, and then dividing this product by the weight of the anodized electrode body.

In one particular embodiment, the porous anode body can be formed from a powder having a specific charge ranging from about 10,000 µF*V/g to about 70,000 µF*V/g, in some embodiments from about 15,000 µF*V/g to about 65,000 µF*V/g, and in some embodiments from about 20,000 µF*V/g to about 60,000 µF*V/g. It is also to be understood that in some embodiments, both the porous anode body can be formed from a powder having a higher specific charge ranging from about 60,000 µF*V/g to about 500,000 µF*V/g, in some embodiments from about 70,000 µF*V/g to about 400,000 µF*V/g, and in some embodiments from about 80,000 µF*V/g to about 300,000 µF*V/g.

To form the porous anode body from the valve metal composition, the powder of the valve metal composition may contain particles any of a variety of shapes, such as nodular, angular, flake, etc., as well as mixtures thereof. Particularly suitable powders are tantalum powders available from Showa (e.g., S506 powder, S708 powder, S15HB powder, etc.), Cabot Corp. (e.g., C255 flake powder, TU4D flake/nodular powder, etc.), and H.C. Starck (e.g., NH175 nodular powder). Although not required, in some embodiments, the powder of the valve metal composition may be agglomerated using any technique known in the art, such as through heat treatment. In other embodiments, the powder may be non-agglomerated to provide for reduced surface porosity, which can enable the formation of a more uniform metallic PVD layer directly on the porous anode body, which can, in turn, enhance and/or ensure the impermeability of the resulting metallic PVD layer.

Prior to forming the powder into the shape of an anode body, it may also be optionally mixed with a binder and/or lubricant to ensure that the particles adequately adhere to each other when sintered to form the anode body. It should be understood, however, that binders and/or lubricants are not necessarily required in the present invention, as the reduced thickness of the porous anode body may eliminate the need for a binder or lubricant to ensure adequate adherence of the particles to each other. The resulting powder may then be compacted to form a pellet (e.g., an anode body pellet) using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

In one particular embodiment, a press mold may be employed that includes a die having two or more portions (e.g., upper and lower portions) configured to form the anode body. During use, the portions of the die may be placed adjacent to each other so that their walls are substantially aligned to form a die cavity having the desired shape of the anode body. After filling the die with powder, the die cavity may then be closed and subjected to compressive forces by a punch.

Regardless of the specific press mold from which the anode pellet is formed, the resulting porous anode body can be pressed to a press density ranging from about 3.5 grams per cubic centimeter to about 7.5 grams per cubic centimeter, in some embodiments from about 3.75 grams per cubic centimeter to about 7 grams per cubic centimeter, and in some embodiments, from about 4 grams per cubic centimeter to about 6.5 grams per cubic centimeter. In one particular embodiment, such as when agglomerated powder is used to form the porous anode body, the porous anode body can be pressed to a press density ranging from about 5.1 grams per cubic centimeter to about 8 grams per cubic centimeter, in some embodiments from about 5.25 grams per cubic centimeter to about 7.5 grams per cubic centimeter, in some embodiments from about 5.5 grams per cubic centimeter to about 7 grams per cubic centimeter, and in some embodiments from about 5.75 grams per cubic centimeter to about 6.5 grams per cubic centimeter, where increasing the press density can reduce the diameter of any inter-agglomerate voids to diameters of less than or equal to about 10 micrometers. For instance, the diameter of the inter-agglomerate voids can range from about 0.1 micrometers to about 10 micrometers, such as from about 0.5 micrometers to about 5 micrometers, such as from about 1 micrometer to about 4 micrometers, such as from about 2 micrometers to about 3 micrometers. The reduced diameter of the inter-agglomerate voids can result in a more uniform coating of the metallic PVD layer onto a planar surface of the porous anode body to ensure its impermeability to liquids and/or hermeticity as discussed in more detail below. Further, it is to be understood that the press density is determined by dividing the weight of the pressed porous anode body by the volume of the pressed porous anode body.

After pressing, any binder/lubricant that was optionally used may be removed by heating the porous anode body under vacuum at a certain temperature (e.g., from about 150° C. to about 500° C.) for several minutes. Alternatively, the binder/lubricant may also be removed by contacting the porous anode body with an aqueous solution, such as described in U.S. Pat. No. 6,197,252 to Bishop, et al., which is incorporated herein in its entirety by reference thereto for all purposes. Thereafter, a planar surface of the porous anode body can be sputtered with a metallic PVD layer as described in more detail below and then sintered to form a porous anode body. However, it is also to be understood that the metallic PVD layer can be sputtered onto a planar surface of the porous anode body after sintering.

The porous anode body (and the metallic PVD player if already sputtered onto the porous anode body at this stage) can typically be sintered at a temperature ranging from about 1000° C. to about 2000° C., in some embodiments from about 1100° C. to about 1900° C., and in some embodiments, from about 1200° C. to about 1800° C., for a time of from about 1 minute to about 100 minutes, and in some embodiments, from about 15 minutes to about 60 minutes. If desired and although not required, sintering may occur in an atmosphere that limits the transfer of oxygen atoms to the porous anode body. For example, sintering may occur in an inert, vacuum, or reducing atmosphere. In one particular embodiment, vacuum sintering may occur at a pressure of from about $1 \times 10^{-9}$ Torr to about 100 Torr, in some embodiments from about $1 \times 10^{-8}$ Torr to about 75 Torr, and in some embodiments from about $1 \times 10^{-7}$ Torr to about 50 Torr. In another embodiment, sintering may occur in a reducing atmosphere of, for instance, hydrogen, where the atmosphere can have a pressure of from about 10 Torr to about 2000 Torr, in some embodiments from about 100 Torr to about 1000 Torr, and in some embodiments, from about 100

Torr to about 930 Torr. Mixtures of hydrogen and other gases (e.g., argon or nitrogen) may be employed in such a reducing atmosphere.

Before or after sintering, a metallic PVD layer can be sputtered directly onto a planar surface of the porous anode body. The metal used to form the metallic PVD layer can be a valve metal or a refractory metal or alloys thereof or any other suitable metal so long as the metal has a melting point similar to the valve metal used to form the porous anode body. For instance, suitable metals for the metallic PVD layer can include tantalum, niobium, hafnium, titanium, tungsten, vanadium, zirconium, or a combination thereof. Other suitable metals for the metallic PVD layer can include metals having a melting point ranging from about 1500° C. to about 3500° C., such as from about 1750° C. to about 3250° C., such as from about 2000° C. to about 3000° C. In one particular embodiment, the porous anode body and the metallic PVD layer can both be formed from tantalum.

In some embodiments, the metallic PVD layer can be sputtered directly onto the planar surface of the porous anode body before sintering, as the sintering process can improve the bonding between the planar surface of the porous anode boy and the metallic PVD layer and also helps to limit shrinkage-induced anode surface porosity. In other embodiments, the metallic PVD layer can alternatively be sputtered directly onto the planar surface of the porous anode body after sintering. In any event, the metallic PVD layer, which exists in a single plane, is impermeable to liquids, which helps to prevent the application of the dielectric layer or the cathode layer, such as a conductive polymer or $MnO_2$, on or near the anode termination, where it is to be understood that suitable mechanical or chemical means can also be utilized to prevent the dielectric layer or the cathode layer from coming into electrical contact with the anode termination. In addition, the volumetric efficiency of the resulting capacitor can be enhanced via use of the metallic PVD layer and anode body configuration of the present invention.

Meanwhile, in contrast to the porous anode body and sputtered metallic PVD layer arrangement described above, an anode body (e.g., a tantalum pellet) with an embedded anode lead wire suffers from a weak sinter connection between the tantalum pellet and the very low surface area (low surface energy) anode lead wire, and this problem is exacerbated by the low pressed densities and sinter temperatures required to achieve good volumetric efficiencies using high specific charge tantalum powders. Further, while welding the anode lead wire results in a better bond than the sintering of an embedded wire, welding damages a proportionately large volume of the tantalum pellet to achieve this stronger connection, as a significant number of tantalum particles from the compact must be melted to create a weld nugget of sufficient size to realize the desired connection strength. Also, as these tantalum particles are consumed to create the weld nugget, a very large layer of tantalum oxide is created around the weld zone, which must be diffused during sintering or the anodes electrical properties will be degraded.

Alternatively, attaching a tantalum pellet to a seeded tantalum substrate is efficient for obtaining a very strong bond as the surface energy of the two surfaces being bonded (e.g., the seed layer and the tantalum pellet), are sufficiently high so that a strong bond can be achieved at sinter temperatures that maximize the efficiency of the high specific charge powders. Also, the bond between the layers is over a large contact area ensuring the high overall strength of the bond. However, this method consumes significant volume on the finished anode resulting in overall loss of volumetric efficiency.

In addition, although welding an anode foil to an anode body or forming an anode body from two pellets having two different press densities such that one pellet is impermeable or hermetic can solve problems related to volumetric efficiency, these processes can be inefficient due to additional steps required. For instance, it is time consuming and tedious to remove a portion of the anode foil, such as a tab, that extend beyond the sides of the capacitor element, and the steps of welding the anode foil to the anode body and removing the tab can damage the anode body inadvertently. In addition, it is also time consuming and tedious to form two anode pellets having two different press densities.

On the other hand, by sputtering a metallic PVD layer directly to the porous anode body as described in the present invention, the aforementioned problems with anode lead wires, seeded substrates, welded anode foils, and the use of two anode pellets with different press densities are overcome in forming a volumetrically efficient capacitor element in an efficient manner. Specifically, the metallic PVD layer can be applied in a sputtering process that does not involve, for instance, the burdensome processes of pressing two pellets to achieve two different densities for impermeability and/or hermeticity purposes, having to weld an anode foil onto an anode pellet and then remove a portion of the anode foil, etc. In addition, the sputtered metallic PVD layer can be applied before or after sintering of the porous anode body to provide for a flexible manufacturing process.

Further, during the sputtering process, the incidence angle, which is the angle between a ray incident on a planar surface of the porous anode body and the line perpendicular to the surface at the point of incidence, called the normal, or, in other words, the degree of the angle from normal at which the sputtered metallic PVD layer is delivered to the planar surface of the porous anode body, can be adjusted in order to uniformly and evenly coat a planar surface of the porous anode body. For instance, in some embodiments, the incidence angle can vary between about 0° and about 90°, such as between about 0° and about 60°, such as between about 0° and 45° during the sputtering process. In one particular embodiment, the incidence angle at which the sputtered metallic PVD layer can be applied to the planar surface of the porous anode body can start at about 90°, about 60°, or about 45° and can be automatically or manually decreased during sputtering until the incidence angle at which sputtering is completed is about 0°. In addition, due to adjusting the incidence angle during sputtering, inter-agglomerate voids having diameters of up to about 10 micrometers can be filled so that a continuous metallic PVD layer covers the planar surface of the porous anode body.

Further, the metallic PVD layer contemplated by the present invention can have a thickness ranging from about 0.01 micrometers to about 10 micrometers, such as from about 0.025 micrometers to about 7.5 micrometers, such as from about 0.05 micrometers to about 5 micrometers. Thus, the metallic PVD layer consumes significantly less of the available volume of the anode compared to known capacitor designs, resulting in a higher volumetric efficiency compared to other designs.

Both the sintered porous anode body 102 and the metallic PVD layer 104 of the anode component of the solid electrolytic capacitor of the present invention can have a rectangular shape. However, in addition to having a rectangular shape, it is to be understood that the anode body and/or metallic PVD layer can be cylindrical, circular, square, D-shaped, etc. Further, the anode body may also be "fluted" in that it may contain one or more furrows, grooves, depressions, or indentations to increase the surface to volume ratio to minimize ESR and extend the frequency response of the capacitor. Such "fluted" anode bodies are described, for instance, in U.S. Pat. No. 6,191,936 to Webber, et al.; U.S. Pat. No. 5,949,639 to Maeda, et al.; and U.S. Pat. No. 3,345,545 to Bourqault et al., as well as U.S. Patent Application Publication No. 2005/0270725 to Hahn, et al., all of which are incorporated herein in their entirety by reference thereto for all purposes.

Regardless of the particular shape of the anode body 102 or the metallic PVD layer 104, the height or thickness of the anode body 102 and the metallic PVD layer 104 can be minimized due to the ability to form an impermeable barrier with the thin metallic PVD layer 104 such that the resulting solid electrolytic capacitor 112 can have a low height profile to facilitate its use, for example, as an embedded passive component or microchip in a printed circuit board. However, in other embodiments, it is to be understood that the resulting solid electrolytic capacitor 112 can be surface mounted. Referring to FIG. 1A, the capacitor element 112 component including the anode body 102 and the metallic PVD layer 104 and any additional layers discussed in more detail below can have a height or thickness $T_1$ in the x-direction ranging from about 100.01 micrometers to about 410 micrometers, such as from about 150.01 micrometers to about 357.5 micrometers, such as from about 200.01 micrometers to about 305 micrometers. Meanwhile, as mentioned above, the metallic PVD layer 104 can have a thickness $T_2$ in the x-direction ranging from about 0.01 micrometers to about 10 micrometers, such as from about 0.025 micrometers to about 7.5 micrometers, such as from about 0.05 micrometers to about 5 micrometers. Further, the anode body 102 can have a thickness $T_3$ in the x-direction ranging from about 100 micrometers to about 400 micrometers, such as from about 150 micrometers to about 350 micrometers, such as from about 200 micrometers to about 300 micrometers. In addition, the thickness $T_2$ of the metallic PVD layer can be from about 0.01% to about 10%, such as from about 0.02% to about 5%, such as from about 0.04% to about 1% of the overall height $T_1$ of the capacitor element 112.

Further, referring to FIGS. 1A-1B, the capacitor element 112 including the anode body 102 and any additional layers discussed in more detail below can have a width $W_1$ in the y-direction and/or a length in the z-direction $L_1$ ranging from about 0.5 millimeters to about 5 millimeters, such as from about 0.75 millimeters to about 4 millimeters, such as from about 1 millimeter to about 3 millimeters. Meanwhile, the metallic PVD layer 104 in the finished capacitor element 112 can have a width $W_2$ ranging from about 0.25 millimeters to about 5 millimeters, such as from about 0.5 millimeters to about 4 millimeters, such as from about 0.75 millimeters to about 3 millimeters. In addition, although the metallic PVD layer 104 is shown as having a width $W_2$ that is less than the overall width $W_1$ of the capacitor element 112, in some embodiments, $W_1$ and $W_2$ can be equal.

II. Dielectric

Once a surface of the anode body is sputtered with a metallic PVD layer as described above, the resulting anode component may be anodized so that a dielectric is formed over a surface of the anode body and/or within the entirety of the anode body. During the anodization process, the dielectric is prevented from forming on the lower surface of the metallic PVD layer from its upper surface via a lower surface of the porous anode body due to the impermeability of the metallic PVD layer. Meanwhile, at least the portion of a lower surface of the metallic PVD layer that will ultimately be connected to the anode termination must be physically and/or chemically masked or later stripped of the dielectric. In one particular embodiment, the lower surface of the metallic PVD layer can be masked with an acrylate-based polymer or any other suitable masking material. For instance, the anodization mask can be a UV curable urethane acrylate. In one embodiment, the entirety of the lower surface of the metallic PVD layer will be free of the dielectric after mask removal or dielectric stripping. However, it is to be understood that in some embodiments, a significant portion (e.g., from about 75% to about 100%, such as from about 80% to about 99%, such as from about 85% to about 95%) of the lower surface of the metallic PVD layer will be masked and the remaining portion of the lower surface of the metallic PVD layer will be anodized.

Figure 1B:
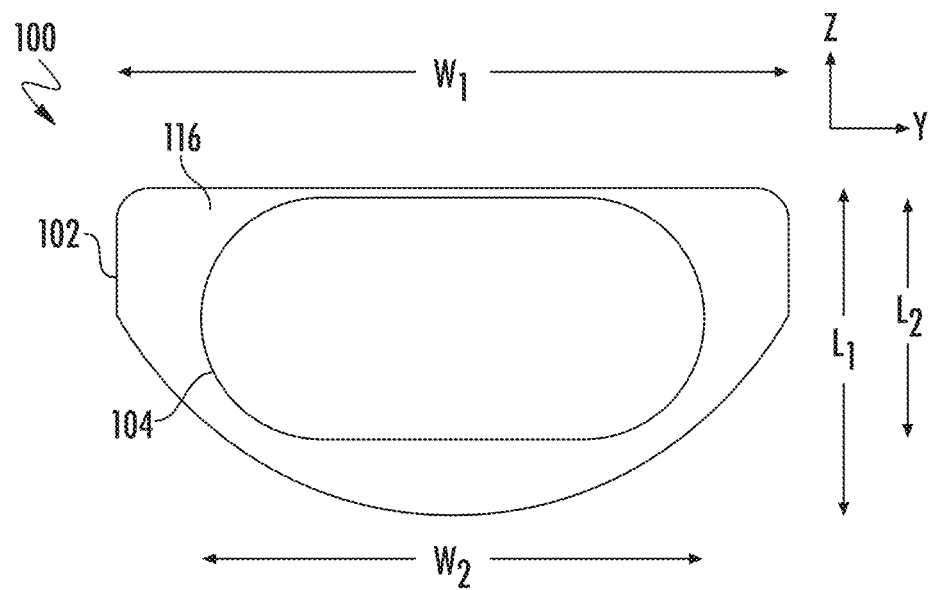
FIG. 1B is a bottom surface view of the solid electrolytic capacitor of FIG. 1A and illustrates that the metallic PVD layer can extend over a portion of a lower surface of the anode body.

Although not shown in FIGS. 1A-1B, it is to be understood that after anodization, the dielectric is formed on surfaces within the anode body 102, such as inside its porous structure. Further, a dielectric layer 106 is formed on exterior surfaces of the anode body 102. For instance, as shown in FIGS. 1A-1B, the dielectric layer 106 can be formed over an upper surface 114, a first side surface 118, and a second side surface 120 of the anode body 102, as well as one or more portions of the lower surface 116 of the anode body 102 depending on where an anodization mask is applied. Meanwhile, the upper surface 122 of the metallic PVD layer 104 is physically, electrically, and/or chemically in contact with the lower surface 116 of the porous anode body 102 such that no dielectric layer 106 forms between the porous anode body 102 and the metallic PVD layer 104. In addition, the portion of the lower surface 124 of the metallic PVD layer 104 that will ultimately be in contact with an anode termination is free of the dielectric layer 106 due to the application of an anodization mask that is later removed. It should also be understood that regardless of the exact surfaces on which it is located, the dielectric layer 106 can have a thickness of from about 20 nanometers to about 800 nanometers, in some embodiments from about 40 nanometers to about 600 nanometers, and in some embodiments from about 60 nanometers to about 400 nanometers, where the dielectric layer 106 can provide a coating to physically protect the resulting capacitor.

As stated above, the dielectric is formed by anodization. Anodization is an electrochemical process by which the anode component is oxidized to form a material having a relatively high dielectric constant. For example, the tantalum anode body may be anodized to tantalum pentoxide ($Ta_2O_5$). Typically, anodization is performed by initially applying an electrolyte to the anode body, such as by dipping the anode body into the electrolyte. The electrolyte is generally in the form of a liquid, such as a solution (e.g., acid or alkaline), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive having any suitable range of ionic conductivities. Exemplary electrolytes may include metal salts, alkali salts, alkali salt mixed with a glycol, an acid mixed with an organic solvent, or phosphoric acid mixed with a glycol such as ethylene glycol. To enhance the ionic conductivity of the electrolyte, a compound may be employed that is capable of dissociating in the solvent to form ions. Suitable ionic compounds for this purpose may include, for instance, acids, such as nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

During anodization, a current is passed through the electrolyte to form the dielectric layer. When protic anodization electrolytes are utilized, the rate limiting nature of the anodization process allows for the management of the dielectric thickness through control of the anodization voltage. For example, the anodization power supply may be initially configured galvanostatically until the required voltage is attained, thereafter being switched to a potentiostatic control mode and maintaining the required voltage until the current passing through the electrolyte reaches a fractional value of the initial current achieved in the galvanostatic control mode. Dielectric thickness control can also be achieved through fixed soak times in the potentiostatic control mode. Other known methods may also be employed, such as pulse or step potentiostatic methods. Anodization voltages typically range from about 4 volts to about 250 volts, such as from about 5 volts to about 200 volts, such as from about 9 volts to about 100 volts. During anodization, the electrolyte may be kept at an elevated temperature, such as from about 30° C. to about 200° C., in some embodiments from about 40° C. to about 150° C., such as sin some embodiments from about 50° C. to about 100° C. Anodic oxidation may also be done at ambient temperature or lower.

As discussed above, the resulting dielectric layer 106 forms on the surfaces of the anode body 102, including those inside the porous anode body structure. The dielectric layer 106 may also form on the side surfaces 126 and 128 of the metallic PVD layer 104, and a portion of the lower surface 124 of the metallic PVD layer 104, although the impermeability of the metallic PVD layer 104 prevents the dielectric from penetrating inside the metallic PVD layer 104, and the formation of the dielectric layer 106 on the lower surface 124 and exposed side surfaces 126 and 128 of the metallic PVD layer 104 may be prevented by known mechanical or chemical masking means. Meanwhile, the upper surface 122 of the metallic PVD layer 104 is physically, electrically, and/or chemically in contact with the lower surface 116 of the porous anode body 102 such that no dielectric layer 106 forms between the porous anode body 102 and the metallic PVD layer 104. In any event, at least a portion of the lower surface 124 of the metallic PVD layer 104 can be free of the dielectric layer 106, where this portion is ultimately connected to an anode termination. The rate of dielectric formation can be governed in part by temperature, with lower temperatures generally resulting in longer formation times.

III. Cathode

Referring again to FIGS. 1A-1B, after anodization, the anode body 102 including the dielectric layer 106 may then be subjected to a step for forming a cathode layer 108 that includes a solid electrolyte, such as a manganese dioxide, a conductive polymer, or a combination thereof, etc. However, at least a portion of the lower surface 124 of the metallic PVD layer 104 must be free of the cathode layer 108 to maintain electrical isolation between the anode and the cathode components of the capacitor, and the impermeability of the metallic PVD layer 104 to liquids helps prevent the transmission of the solid electrolyte material from the upper surface 122 of the metallic PVD layer 104 to the lower surface 124 of the metallic PVD layer 104. Further, it is to be understood that the cathode layer 108 is only present where the dielectric layer 106 is also present. For example, in some embodiments, such as where the dielectric layer 106 coats the side surfaces 126 and 128 and a portion of the lower surface 124 of the metallic PVD layer 104, the cathode layer 108 may also coat the side surfaces 126 and 128 and a portion of the lower surface 124 of the metallic PVD layer 104, although in such embodiments, the anode termination cannot contact these dielectric and cathode-coated areas of the metallic PVD layer 104. Preventing deposition of the cathode layer 108 on certain surfaces of the metallic PVD layer 104 as discussed above may be accomplished through known mechanical or chemical means during deposition of the cathode layer or via post-deposition material removal.

If the solid electrolyte includes manganese dioxide, the manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, or in conjunction with the formation of a manganese dioxide solid electrolyte, a conductive polymer coating may be employed that contains one or more polyheterocycles (e.g., polypyrroles; polythiophenes, poly (3,4-ethylenedioxythiophene) (PEDT); polyanilines); polyacetylenes; poly-p-phenylenes; polyphenolates; and derivatives thereof. Moreover, if desired, the conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode body. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy-thiophene) may initially be mixed with a polymerization catalyst to form a solution. For example, one suitable polymerization catalyst is CLEVIOS C, which is iron III toluene-sulfonate and sold by H.C. Starck. CLEVIOS C is a commercially available catalyst for CLEVIOS M, which is 3,4-ethylene dioxythiophene, a PEDT monomer also sold by H.C. Starck. Once a catalyst dispersion is formed, the anode body may then be dipped into the dispersion so that the polymer forms on the surface of the anode body. Alternatively, the catalyst and monomer(s) may also be applied separately to the anode body. In one embodiment, for example, the catalyst may be dissolved in a solvent (e.g., butanol) and then applied to the anode body as a dipping solution. The anode body may then be dried to remove the solvent therefrom. Thereafter, the anode body may be dipped into a solution containing the appropriate monomer. Once the monomer contacts the surface of the anode body containing the catalyst, it chemically polymerizes thereon. Techniques, such as described above, may be described in more detail in U.S. Publication No. 2008/0232037 to Biler.

During or after the application of the solid electrolyte cathode layer, the solid electrolyte may be electrolytically healed. Healing may occur after each application of a solid electrolyte layer or may occur after the application of the entire coating. In some embodiments, the solid electrolyte may be healed by dipping the anode body into an electrolyte solution, such as a solution of acetic acid, and thereafter applying a constant voltage to the solution until the current is reduced to a preselected level or a predetermined soak time has elapsed. If desired, such healing may be accomplished in multiple steps. After application of some or all of the layers described above, anode component containing the dielectric layer and cathode may then be washed if desired to remove various byproducts, excess catalysts, and so forth. Further, in some instances, drying may be utilized after some or all of the dipping operations described above. For example, drying may be desired after applying the catalyst and/or after washing the component in order to open the pores of the anode body so that it can receive a liquid during subsequent dipping steps.

IV. Terminations

Referring to FIG. 1A, the solid electrolytic capacitor of the present invention may also contain an anode termination 130 to which the metallic PVD layer 104 of the capacitor element 112 is electrically connected and a cathode termination 132 to which the cathode layer 108 of the capacitor element is electrically connected. In some embodiments, the anode termination 130 and the cathode termination 132 are planar and can be directly connected to the metallic PVD layer 104 and the cathode layer 108, respectively, wherein the planar configuration and the direct electrical connection both improve the volumetric efficiency of the resulting capacitor. Further, the direct connection between the metallic PVD layer 104 and the anode termination 130 eliminates the need for an anode lead wire. Moreover, the thickness $T_4$ in the x-direction of the anode termination 130 and the thickness $T_5$ of the cathode termination 132 in the x-direction can be controlled to minimize the height profile or thickness of the capacitor to improve the volumetric efficiency of the resulting capacitor. For instance, the thickness $T_4$ of the anode termination 130 may range from about 0.5 micrometers to about 5 micrometers, such as from about 0.75 micrometers to about 4.5 micrometers, such as from about 1 micrometer to about 4 micrometers, and the thickness $T_5$ of the cathode termination 132 may range from about 5 micrometers to about 40 micrometers, such as from about 10 micrometers to about 35 micrometers, such as from about 15 micrometers to about 30 micrometers.

Any conductive material may be employed to form the terminations, such as a conductive metal (e.g., gold, copper, nickel, silver, nickel, zinc, tin, palladium, lead, copper, aluminum, molybdenum, titanium, iron, zirconium, magnesium, tungsten and alloys thereof). In one embodiment, however, the conductive metal can be a metal that is resistant to oxidation, such as gold, palladium, or platinum. In an additional embodiment, the conductive material from which the anode termination and the cathode termination are formed can be applied via a thin layer deposition technique such as physical vapor deposition (PVD), chemical vapor deposition (CVD), or any other suitable technique. PVD and CVD can facilitate the deposition of a thin metal layer having a nanometer scale onto the anode substrate and cathode, which can further limit the height profile or thickness and enhance the volumetric efficiency of the solid electrolytic capacitor of the present invention. It is also to be understood that when formed from a oxidation resistant metal, the thin metal layer can be applied so that it is in direct contact with the metallic PVD layer or the solid electrolyte, without the need for the application of a carbon layer or any other barrier layer between the solid electrolyte and the cathode termination as are typically applied to prevent oxidation, where the elimination of such layers further reduces the thickness or height profile and enhances the volumetric efficiency of the resulting solid electrolytic capacitor. In another particular embodiment, the terminations can be in the form of a conductive paste, such as a silver polyimide paste that can be electroplated with nickel and a finish layer or a copper alloy conductive paste.

In still another embodiment, the terminations can be in the form of a metal plate or layer that can be connected to the anode substrate and cathode using any technique known in the art, such as adhesive bonding and the like. In one embodiment, for example, a conductive adhesive may initially be applied to a surface of the anode and/or cathode terminations. The conductive adhesive may include, for instance, conductive metal particles contained with a resin composition. The metal particles may be gold, silver, copper, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

In yet another embodiment, the terminations can include a PVD or CVD oxygen barrier layer as described above, on which a separate metal layer or plate is disposed. For instance, the oxygen barrier layer can be gold, and the separate metal layer can be silver, titanium, etc.

In one particular embodiment, the anode termination can include a sputtered PVD layer that serves as an oxide dilution layer, such as a sputtered PVD layer of tantalum; a sputtered PVD layer that serves as an oxidation barrier layer, such as a sputtered gold layer; and a sputtered PVD layer that serves as the exterior-most layer of the anode termination, which can be a sputtered copper layer, while the cathode termination can include a oxidation barrier layer and a conductive paste layer.

In one particular embodiment and referring to FIG. 1A, the solid electrolyte 108 may be applied with an oxidation barrier layer 146, a conductive paste layer 148, or a combination thereof to form the cathode termination 132. The oxidation barrier layer 146 may limit contact of the conductive paste layer 148 with the solid electrolyte, which can reduce the risk of oxidation of the conductive paste layer 148 by the solid electrolyte (e.g., manganese dioxide). For instance, in one particular embodiment, the cathode termination 132 can include an oxidation barrier layer 146 and a conductive paste layer 148, where the oxidation barrier layer 146 is disposed between the conductive paste layer 148 and the cathode layer 108. The oxidation barrier layer 146 can be carbon-based (e.g., graphite), and the conductive paste layer 148 can include a copper alloy. The oxidation barrier layer 146 and the conductive paste layer 148 used to form the cathode termination 130 may cover some or all of the solid electrolyte, while the metallic PVD layer 104 is isolated from such layers as shown in FIG. 1A. Further, the oxidation barrier layer 146 and the conductive paste layer 148 can have a total thickness ranging from about 5 micrometers to about 40 micrometers, such as from about 10 micrometers to about 35 micrometers, such as from about 15 micrometers to about 30 micrometers.

Turning now to the anode termination 132, in some embodiments and referring to FIG. 1A, a thin layer of metal, such as tantalum, can serve as an oxide dilution layer 150 and can be applied to the lower surface 124 of the metallic PVD layer 104 via physical vapor deposition (PVD), chemical vapor deposition (CVD), or any other suitable method to form part of the anode termination 130. In addition, a thin layer of an oxidation resistant material layer 152, such as gold, can be applied to the oxide dilution layer 150 via physical vapor deposition (PVD), chemical vapor deposition (CVD), or any other suitable method as an additional layer of the anode termination 130 to provide a barrier between the metallic PVD layer 104 and the outermost metallic layer 154 of the anode termination 130, where the outermost metallic layer 154 of the anode termination 130 can be formed from any suitable metal such as copper and can be applied via physical vapor deposition (PVD), chemical vapor deposition (CVD), or any other suitable method. Further, in embodiments where the sputtered oxidation resistant material 152 is of sufficient thickness, the oxidation resistant material layer 152 can provide sufficient mounting stability such that the outermost metallic layer 154 of the anode termination 130 is not required. In such embodiments, the oxidation resistant material layer 152 can have a thickness ranging from about 10 nanometers to about 200 nanometers, such as from about 25 nanometers to about 150 nanometers, such as from about 50 nanometers to about 100 nanometers.

In other embodiments, the oxidation resistant material 152 may be embedded sufficiently into the metallic PVD layer 104 such that the oxide dilution layer 150 is not necessary. In such embodiments, the oxidation resistant material 152 can be embedded within the metallic PVD layer 104, and the outermost metallic layer 154 can be adjacent the metallic PVD layer 104 with the oxidation resistant material 152 embedded therein.

V. Additional Layers/Components

In addition, the solid electrolytic capacitor of the present invention can also optionally include an insulating resin 110 (e.g., a conformal polyimide coating or an epoxy resin) that can be applied around the porous anode body 102 at portions of its upper surface 114, lower surface 116, side surface 118, side surface 120, and its front and rear surfaces (not shown), where the insulating resin 110 leaves portions of the anode termination 130 and cathode termination(s) 132 exposed, as shown in FIG. 1A. However, it is also to be understood that the solid electrolytic capacitor can be, for instance, embedded into a printed circuit board without having an insulating resin disposed around the porous anode body 102. Instead, the insulating resin can be added to fill in the space between the circuit board and embedded capacitor after the embedded capacitor is properly positioned, or the printed circuit board can into which the capacitor is embedded can include an insulating resin having a recess into which the capacitor can be inserted. In any event, the particular design of the anode body 102 and the metallic PVD layer 104 limits the amount of insulating resin 110 that may be utilized, which further enhances the volumetric efficiency of the capacitor. For instance, the insulating resin 110 can have a thickness in the y-direction ranging from about 5 micrometers to about 100 micrometers, such as from about 7.5 micrometers to about 75 micrometers, such as from about 10 micrometers to about 50 micrometers.

FIG. 1A is a cross-sectional view of a solid electrolytic capacitor 100 in accordance with one particular embodiment of the present invention, where the solid electrolytic capacitor 100 includes a two electrode configuration where one anode termination 130 and one cathode termination 132 are positioned on opposing sides of the solid electrolytic capacitor 100. As shown, the anode body 102 includes a dielectric layer 106 and a cathode layer 108. Further, an upper surface 122 of the metallic physical vapor deposition (PVD) layer 104 directly contacts the porous anode body 102, and the metallic PVD layer 104 is impermeable to liquids so that the dielectric layer 106 and the cathode layer 108 do not impregnate the metallic PVD layer 104. Further, mechanical and/or chemical means can be utilized to ensure that the exposed surfaces of the metallic PVD layer 104 that are not immediately adjacent and/or in direct contact with the anode body 102 (e.g., the lower surface 124 and side surfaces 126 and 128) can be free of the dielectric layer 106 and the cathode layer 108, although it is to understood that the side surfaces 126 and 128 and a portion of the lower surface 124 of the metallic PVD layer 104 may be coated with the dielectric layer 106 and cathode layer 108 so long as the portion of the lower surface 124 of the metallic PVD layer 104 that is connected to the anode termination 130 is free of and isolated from the dielectric layer 106 and cathode layer 108. Moreover, an oxidation barrier layer 146 and a conductive paste layer 148 can be coated onto at least a portion of the cathode layer 108 to form the cathode termination 132, where the metallic PVD layer 104 is isolated from the oxidation barrier layer 146 and the conductive paste layer 148. Referring still to FIG. 1A, an oxide dilution layer 150 and an oxidation resistant material layer 152 can be positioned between the metallic PVD layer 104 and an outermost metallic layer 154 of the anode termination 132. Further, when the oxidation resistant material 152 is a metal layer, such as a gold layer, and has a sufficient thickness, it can take the place of the outermost metallic layer 154 of the anode termination 132. Further, an optional insulating resin 110 can be disposed around the surfaces of the resulting capacitor element 112, leaving at least a portion of the anode termination 130 and the cathode termination 132 exposed. As shown, the anode termination 130 is positioned near the lower surface 116 of the anode body 102 and the cathode termination 132 is positioned near the upper surface 114 of the anode body 102.

FIG. 1B is a top surface view of the solid electrolytic capacitor 100 of FIG. 1A and illustrates an embodiment where the sputtered metallic PVD layer 104 covers only a portion of the lower surface 116 of the porous anode body spanning a width $W_2$ in the y-direction and a length $L_2$ in the z-direction that are less than the overall width $W_1$ and overall length $L_1$ of the porous anode body 102. However, it is to be understood that the metallic PVD layer 104 can, in some embodiments, cover the entire lower surface 116 of the porous anode body 102 such that the metallic PVD layer 104 extends the entire length $L_1$ in the z-direction and the entire width $W_1$ in the y-direction (as shown in FIG. 1A).

Figure 2:
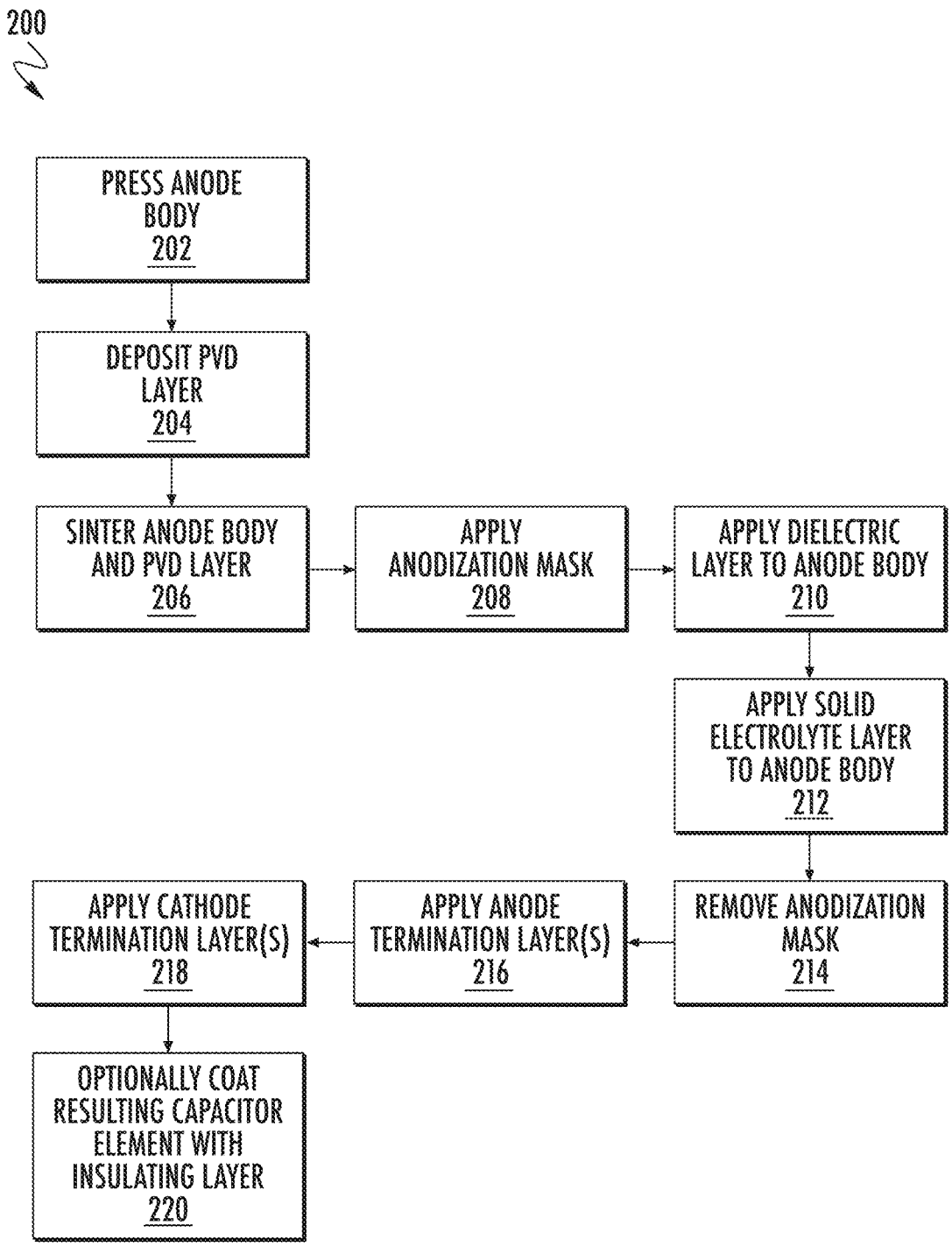
FIG. 2 is a flow chart illustrating a method of forming a solid electrolytic capacitor in accordance with one embodiment of the present invention.

Turning now to FIG. 2, the solid electrolytic capacitor discussed above can be formed according to various methods contemplated by the present invention. In one particular embodiment, the solid electrolytic capacitors can be formed according to method 200. First, in step 202, an anode body 102 can be pressed as described in detail above. Next, in step 204, the metallic PVD layer 104 can be sputtered directly onto a planar surface of the anode body 102. Then, in step 206, the anode body 102 and the metallic PVD layer 104 sputtered thereon can be sintered in an inert, vacuum, or reducing environment, such as in the presence of hydrogen gas to eliminate any microstructural damage that may have occurred. However, it is also to be understood that the anode body 102 can be sintered before step 206 and that the anode body 102 can be sintered before step 206 and at step 206 (e.g., pre-sputtering and post-sputtering). Thereafter, in step 208, an anodization mask, such as an acrylate-based polymer or any other suitable masking material, can be applied to the metallic PVD layer 104. Next, in step 210, the dielectric layer 106 can applied to the anode body 102 (and, optionally, portions of the metallic PVD layer 104 as described above) via anodization as described in detail above. Further, in step 212, the solid electrolyte layer or cathode layer 108 can be applied to the anode body 102 (and, optionally, portions of the metallic PVD layer 104 as described above), after which the anodiziation mask can be removed from the metallic PVD layer 104 in step 214. Next, in step 216 and 218, the anode termination layer(s) and the cathode termination layer(s) can be applied, respectively, although it should be understood that step 218 can be carried out before step 216, or steps 216 and step 218 can be carried out simultaneously. Thereafter, in step 220, the resulting capacitor element 112 can optionally be coated with an insulating layer 110. Moreover, it is to be understood that not all of the steps described above are required and that additional steps as set forth above may be utilized in forming the capacitors and modules contemplated by the present invention.

VI. Applications

In one embodiment of the present invention, the solid electrolytic capacitor of FIG. 1A can be used as an embedded component of a thin electronic part such as a printed circuit board. In another embodiment, the capacitor can have a capacitance rating of about 10 microfarads at a voltage rating of about 10 volts. Due to its small footprint, such a capacitor can be used, for example, in implantable medical devices. The capacitor can have similar dimensions as the silicon-based integrated passives that are known by one of skill in the art and that can be embedded into—a printed circuit board structure. As such, the solid electrolytic capacitor can have a thickness $T_1$ in the x-direction of from about 250 micrometers to about 1000 micrometers, such as from about 275 micrometers to about 800 micrometers, such as from about 300 micrometers to about 700 micrometers.

Figure 3:
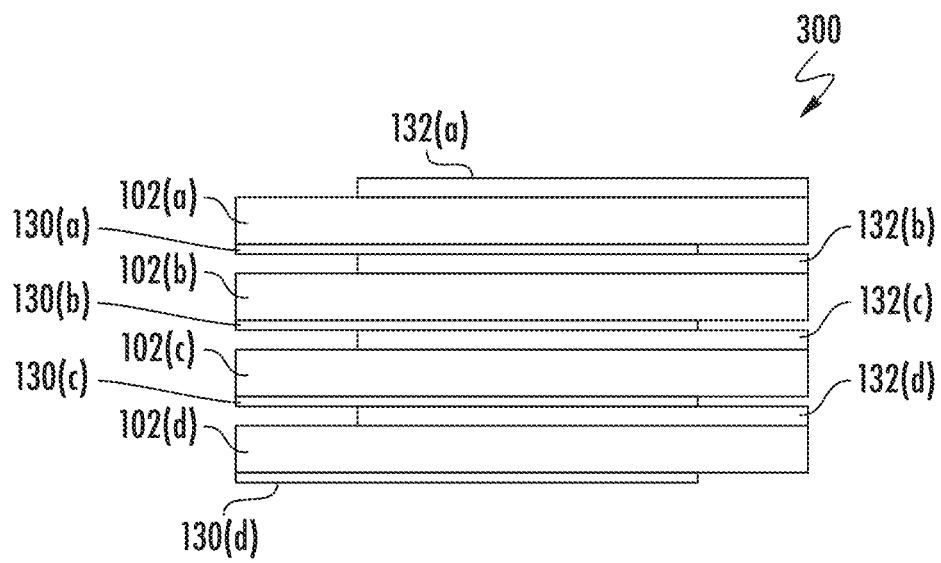
FIG. 3 is a cross-sectional view of a module including multiple capacitors of the present invention arranged in series.
Figure 4:
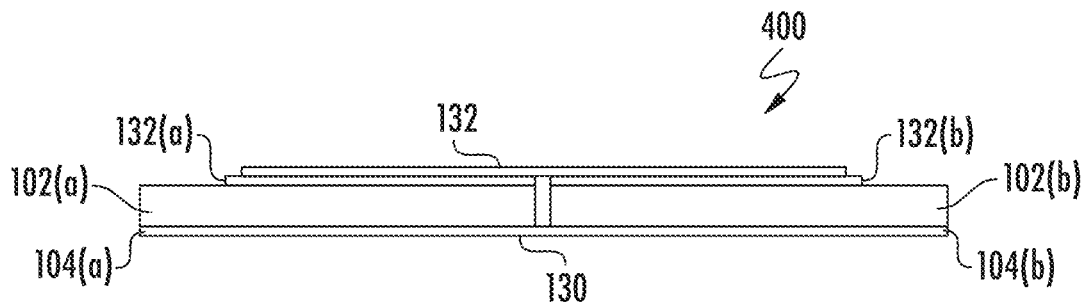
FIG. 4 is a cross-sectional view of a module including multiple capacitors of the present invention arranged in parallel.
Figure 5:
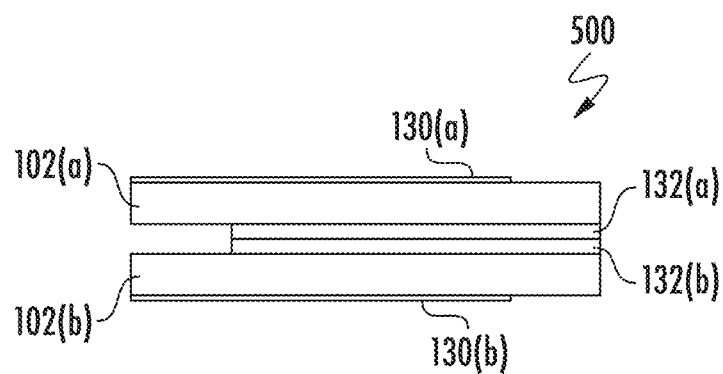
FIG. 5 is a cross-sectional view of a module including multiple capacitors of the present invention arranged in a non-polar configuration.

Referring now to FIGS. 3-5, several modules in which a plurality of the solid electrolytic capacitor of FIGS. 1A-1B can be incorporated are illustrated. Such modules can be encapsulated or left unencapsulated for embedding purposes. The modules can include two or more solid electrolytic capacitors of FIG. 1A-1B that can have the same or different capacitance and voltage ratings. Such modules can achieve increases in voltage rating or capacitance, reduction in equivalent series resistance (ESR), allow for non-polarity, or a combination thereof. Depending on the particular arrangement of the module, voltage ratings well beyond 100 volts can be achieved.

In particular, FIG. 3 shows a module 300 that includes four anode bodies 102(a)-(d), four anode terminations 130 (a)-(d), and four cathode terminations 132(a)-(d) arranged in series. When based on a 10 microfarad, 10 volt capacitor, the module 300 can have a capacitance of 2.5 microfarads and voltage rating of 40 volts.

Further, FIG. 4 shows a module 400 that includes two anode bodies 102(a) and 102(b) and two metallic PVD layers 104(a) and 104(b) arranged in parallel. The module also includes an anode termination 130 and two cathode terminations 132(a) and 132(b) that are electrically connected with a main cathode termination 132. When based on a 10 microfarad, 10 volt capacitor, the module 400 can have a capacitance of 20 microfarads and voltage rating of 10 volts. Although not shown, instead of two capacitors, four capacitors can be arranged in parallel in a two capacitor by two capacitor block to achieve a module having a capacitance of 40 microfarads and a voltage rating of 10 volts.

Meanwhile, FIG. 5 shows a module 500 having a non-polar configuration where two anode bodies 102(a) and 102(b) and two anode terminations 130(a) and 130(b) are arranged such that the cathode terminations 132(a) and 132(b) are in contact as shown. When based on a 10 microfarad, 10 volt capacitor, the module 420 can have a capacitance of 5 microfarads and voltage rating of 10 volts.

Further, while FIGS. 3-5 show modules utilizing capacitor elements with two electrode configurations, it is to be understood that a three electrode configuration, such as two cathode terminations on opposing sides of the solid electrolytic capacitor and one anode termination, can also be utilized, where a three electrode configuration would allow for interlayer connections within a printed circuit board (PCB). It is also to be understood that the present invention contemplates modules with same side electrode configurations. One advantage of utilizing a three electrode or same side electrode configuration is that such designs allow for increased flexibility in PCB layout and interlayer connection design.

The capacitors and modules formed in accordance with the present invention can achieve an advantageously increased capacitance and advantageously reduced Equivalent Series Resistance (ESR), while maintaining comparable levels of leakage current and dissipation factor and while exhibiting excellent high frequency response. The capacitors and modules exhibit improved reliability, making them suitable for use in medical device applications. For instance, the capacitors and modules contemplated by the present invention can be used in defibrillators.

The present invention may be better understood by reference to the following examples.

EXAMPLE 1

Figure 6:
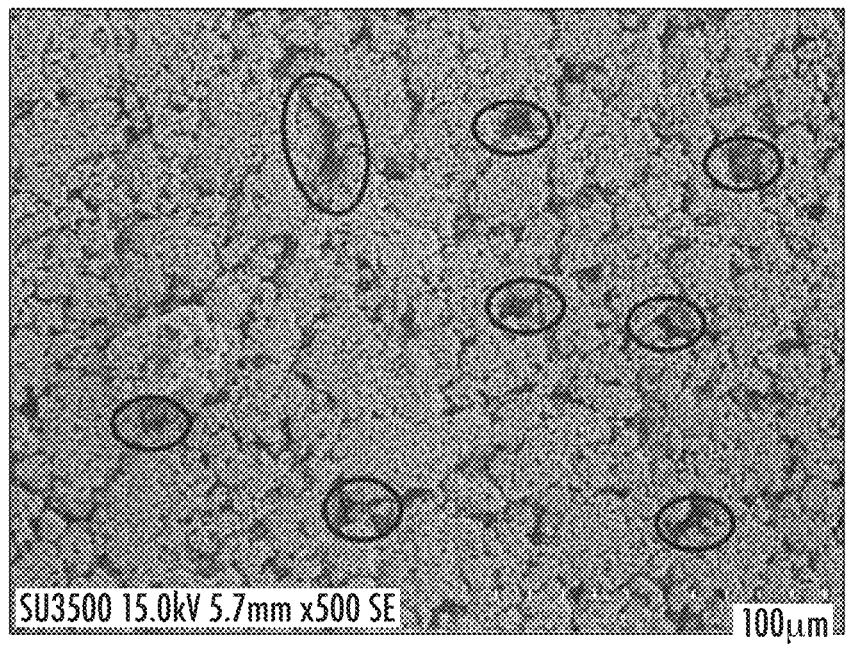
FIG. 6 is a scanning electron micrograph of a planar surface of a porous anode body formed from agglomerated tantalum powder that has been pressed to a density of 4.97 grams per cubic centimeter.
Figure 7:
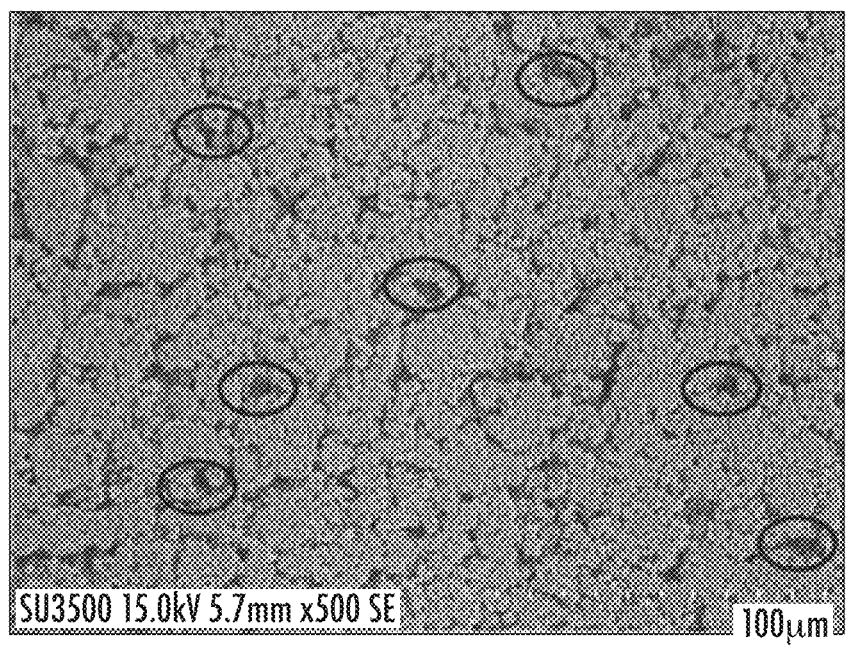
FIG. 7 is a scanning electron micrograph of a planar surface of a porous anode body formed from agglomerated tantalum powder that has been pressed to a density of 5.34 grams per cubic centimeter.
Figure 8:
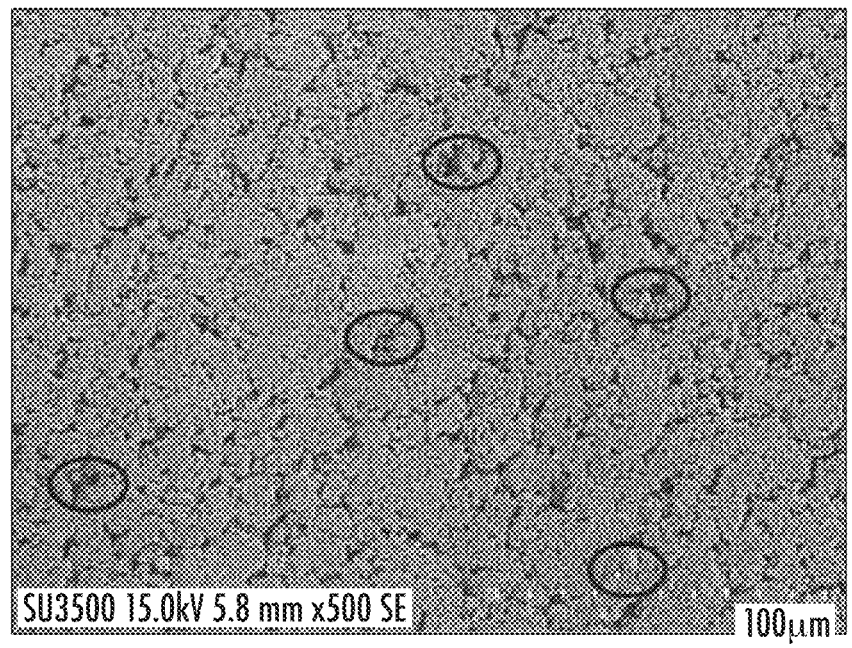
FIG. 8 is a scanning electron micrograph of a planar surface of porous anode body formed from agglomerated tantalum powder that has been pressed to a density of 5.97 grams per cubic centimeter.

In Example 1, agglomerated tantalum powder was first processed through a sieve having a mesh size of 400 to remove any agglomerates having diameters greater than about 38 micrometers, after which the agglomerated powder was pressed to form porous anode bodies with increasing press density. FIG. 6 is a scanning electron micrograph of a porous anode body formed from agglomerated tantalum powder that has been pressed to a density of 4.97 grams per cubic centimeter. FIG. 7 is a scanning electron micrograph of a porous anode body formed from agglomerated tantalum powder that has been pressed to a density of 5.34 grams per cubic centimeter. FIG. 8 is a scanning electron micrograph of a porous anode body formed from agglomerated tantalum powder that has been pressed to a density of 5.97 grams per cubic centimeter. As shown, as the press density increases, the size and frequency of the inter-agglomerate voids (examples circled for reference) decreases, indicating that increasing the press density of agglomerated powder can allow for a more uniform planar surface with reduced porosity on which to apply a metallic PVD layer. The reduced surface porosity can enable the formation of a more uniform metallic PVD layer, particularly when the metallic PVD layer is applied at various incidence angles, and can also provide other performance benefits to a capacitor, such as improved consistency of anode CV per cubic centimeter, reduced counter-electrode variability, etc.

EXAMPLE 2

Figure 9:
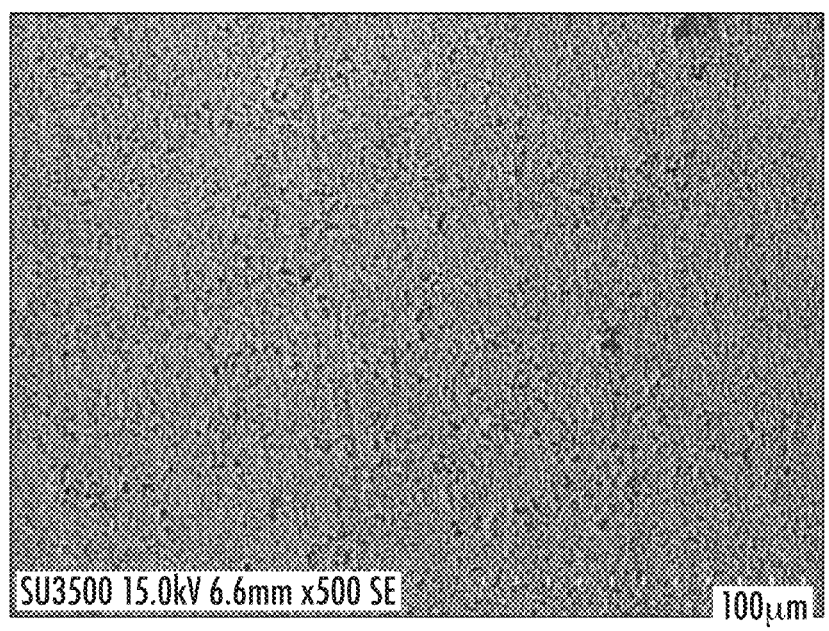
FIG. 9 is a scanning electron micrograph of a planar surface of a porous anode body formed from non-agglomerated tantalum powder that has been pressed to a density of 5.00 grams per cubic centimeter after vacuum sintering at 1300° C. for 10 minutes.
Figure 10:
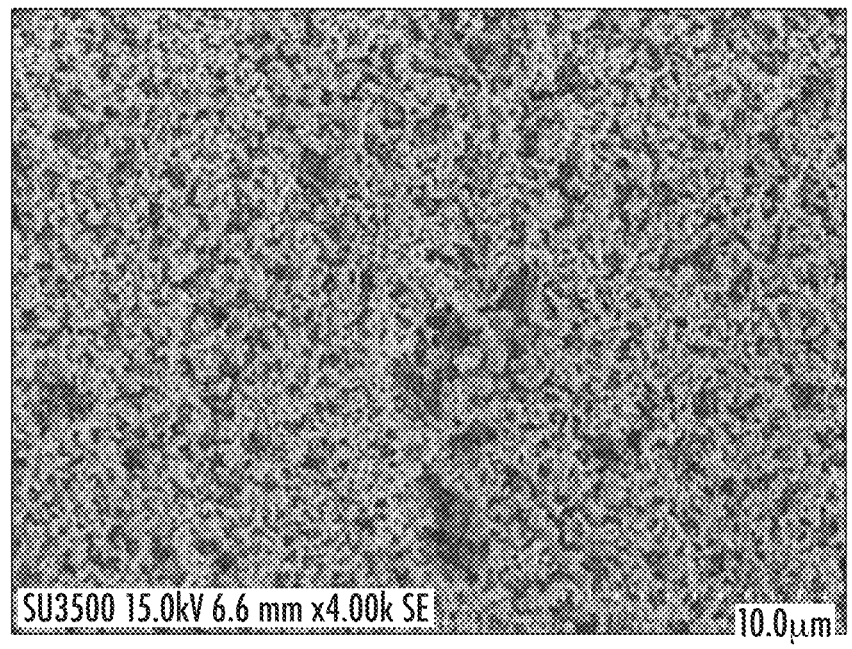
FIG. 10 is a zoomed in view of the planar surface of the porous anode body of FIG. 9.
Figure 11:
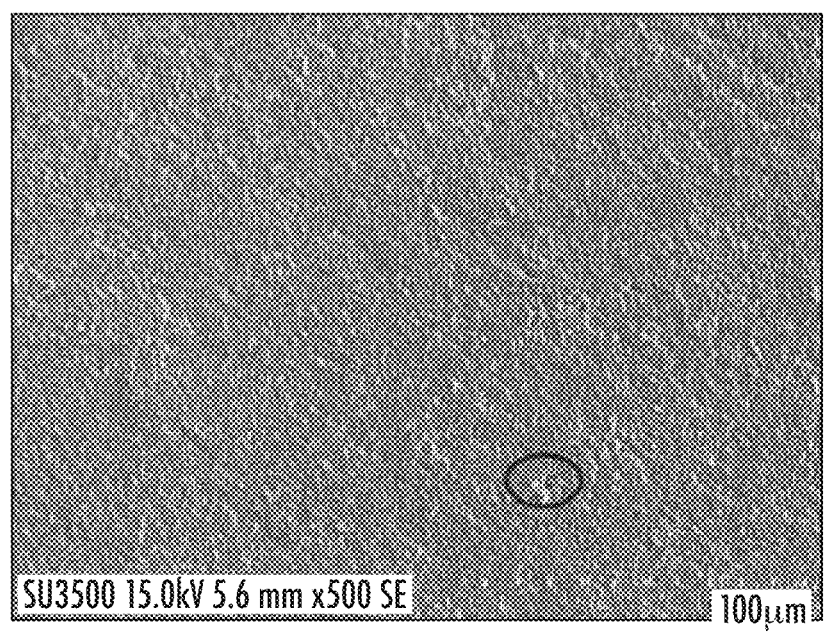
FIG. 11 is a scanning electron micrograph of the planar surface of the porous anode body of FIG. 9 after a tantalum PVD layer having a thickness of 2.8 micrometers was sputtered on the planar surface with a normal incidence (e.g., the sputtering was applied at a 90° angle to the planar surface)
Figure 12:
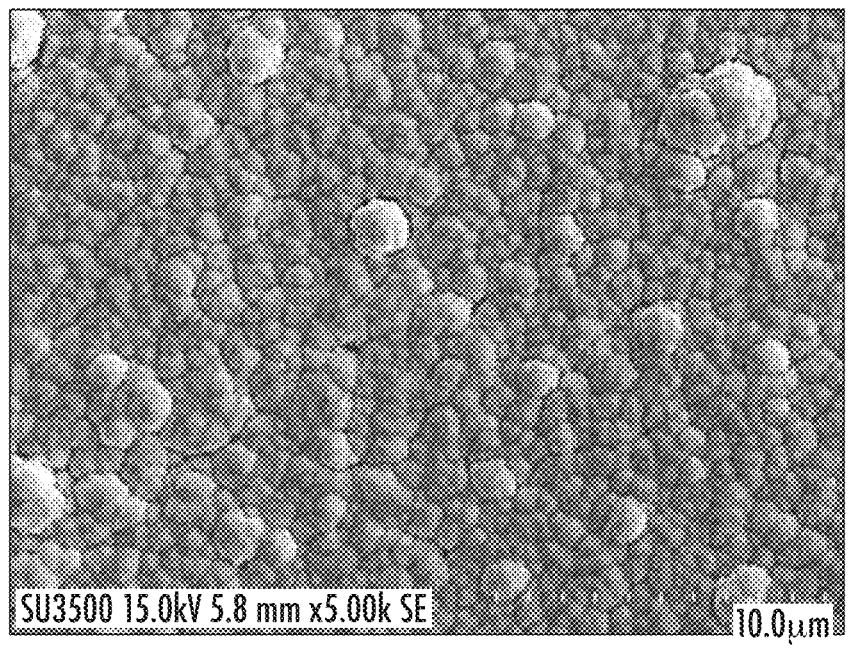
FIG. 12 is a magnified view of the planar surface of the porous anode body of FIG. 11.
Figure 13:
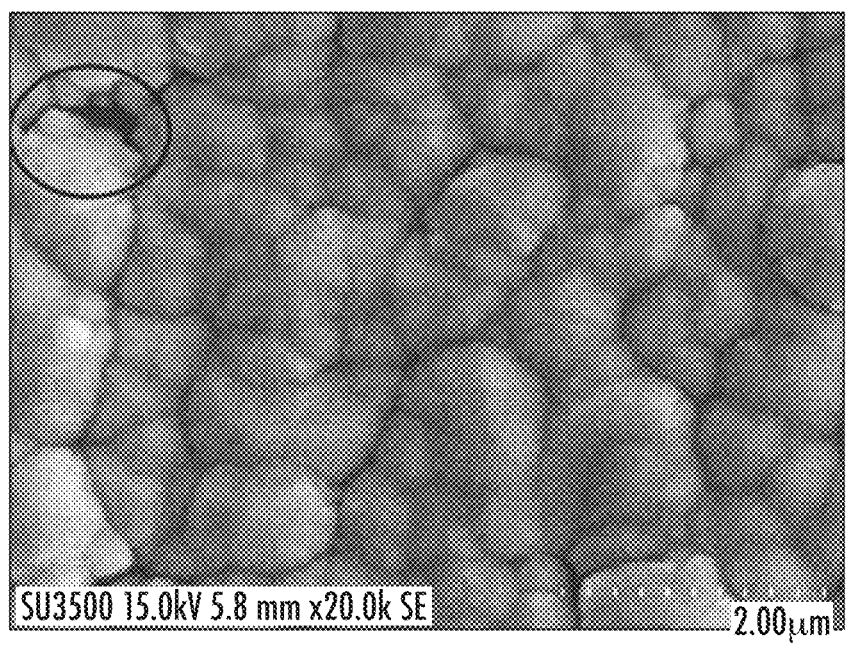
FIG. 13 is an additional magnified view of the planar surface of the porous anode body of FIG. 11.

In Example 2, non-agglomerated tantalum powder was pressed to form a porous anode body having a density of 5 grams per cubic centimeter. FIG. 9 is a scanning electron micrograph of a planar surface of a porous anode body formed from non-agglomerated tantalum powder that has been pressed to a density of 5.00 grams per cubic centimeter after vacuum sintering at 1300° C. for 10 minutes. FIG. 10 is a zoomed in view of the planar surface of the porous anode body of FIG. 9. Further, FIG. 11 is a scanning electron micrograph of the planar surface of the porous anode body of FIG. 9 after a tantalum PVD layer having a thickness of 2.8 micrometers was sputtered on the planar surface with a normal incidence (e.g., the sputtering was applied at a 90° angle to the planar surface), and FIGS. 12 and 13 are magnified views of the metallic PVD layer-coated planar surface of the porous anode body of FIG. 11.

As shown, the open pore structure on the surface of the pressed porous anode body is effectively closed off after application of the tantalum PVD layer, creating a barrier that is impermeable to liquids. The minor voiding seen on the anode with the metallic layer (circled in FIGS. 11 and 13) are shallow, and the bottom of these regions also covered with the metallic PVD layer, thus ensuring liquid impermeability. Such anodes can be sintered again prior to masking and anodization.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:
1. A solid electrolytic capacitor, comprising:
a porous anode body comprising a valve metal, wherein the porous anode body is sintered;
a metallic PVD layer, wherein the metallic PVD layer is disposed directly on a planar surface of the porous anode body, wherein the metallic PVD layer has a thickness ranging from about 0.01 micrometers to about 7.5 micrometers;
a dielectric overlying at least a portion of the porous anode body, wherein the dielectric is also formed within the porous anode body;
a cathode overlying at least a portion of the dielectric that overlies the porous anode body, the cathode comprising a solid electrolyte, wherein at least a portion of a lower surface of the metallic PVD layer is free of the dielectric and the solid electrolyte;
an anode termination that is electrically connected to the portion of the lower surface of the metallic PVD layer that is free of the dielectric and the solid electrolyte; and
a cathode termination that is electrically connected to the solid electrolyte.

2. The solid electrolytic capacitor of claim 1, wherein the porous anode body is formed from a powder of the valve metal, wherein the powder has a specific charge ranging from about 10,000 μF*V/g to about 500,000 μF*V/g.

3. The solid electrolytic capacitor of claim 1, wherein the valve metal comprises tantalum, niobium, aluminum, hafnium, titanium, an electrically conductive oxide thereof, or an electrically conductive nitride thereof.

4. The solid electrolytic capacitor of claim 1, wherein the porous anode body has a thickness of from about 100 micrometers to about 400 micrometers.

5. The solid electrolytic capacitor of claim 1, wherein the metallic PVD layer is impermeable to liquids.

6. The solid electrolytic capacitor of claim 1, wherein the metallic PVD layer is sputtered onto the planar surface of the porous anode body, wherein an upper surface of the metallic PVD layer is in direct contact with the planar surface of the porous anode body.

7. The solid electrolytic capacitor of claim 1, wherein the metallic PVD layer is formed from a metal having a melting point ranging from about 1500° C. to about 3500° C.

8. The solid electrolytic capacitor of claim 1, wherein the metallic PVD layer comprises tantalum, niobium, hafnium, titanium, tungsten, vanadium, zirconium, or a combination thereof.

9. The solid electrolytic capacitor of claim 1, wherein the solid electrolyte comprises manganese dioxide, a conductive polymer, or a combination thereof.

10. The solid electrolytic capacitor of claim 1, wherein the anode termination comprises an oxide dilution layer adjacent the metallic PVD layer, an oxidation resistant material layer adjacent the oxide dilution layer, and an outermost metallic layer adjacent the oxidation resistant material layer.

11. The solid electrolytic capacitor of claim 1, wherein an oxidation resistant material is embedded within the metallic PVD layer, and an outermost metallic layer is adjacent the metallic PVD layer with the oxidation resistant material embedded therein.

12. The solid electrolytic capacitor of claim 1, wherein the cathode termination comprises an oxidation barrier layer and a conductive paste layer.

13. The solid electrolytic capacitor of claim 1, wherein the solid electrolytic capacitor includes a coating of an insulating resin, wherein at least a portion of the anode termination and a portion of the cathode termination are exposed and free of the coating.

14. A module comprising a plurality of the solid electrolytic capacitors of claim 1.

15. The module of claim 14, wherein the plurality of solid electrolytic capacitors are arranged in series, in parallel, or in a non-polar configuration.

16. A method for forming a solid electrolytic capacitor, the method comprising:
    forming a porous anode body from a powder, wherein the powder is formed from a valve metal;
    sintering the porous anode body;
    sputtering a metallic PVD layer directly onto a planar surface of the porous anode body before or after sintering the porous anode body, wherein the metallic PVD layer has a thickness ranging from about 0.01 micrometers to about 7.5 micrometers;
    anodically oxidizing at least a portion of the sintered porous anode body to form a dielectric that overlies at least a portion of the sintered porous anode body, wherein the dielectric is also formed within the sintered porous anode body;
    applying a solid electrolyte to at least a portion of the anodically oxidized sintered porous anode body, wherein at least a portion of a lower surface of the metallic PVD layer is free of the dielectric and the solid electrolyte;
    electrically connecting the portion of the lower surface of the metallic PVD layer that is free of the dielectric and the solid electrolyte to an anode termination; and
    electrically connecting the solid electrolyte to a cathode termination.

17. The method of claim 16, wherein the metallic PVD layer is impermeable to liquids, and wherein the upper surface of the metallic PVD layer is in direct contact with the planar surface of the porous anode body.

18. The method of claim 16, wherein porous anode body is sintered before the metallic PVD layer is sputtered directly onto the planar surface of the porous anode body, further wherein the porous anode body and the metallic PVD layer sputtered thereon are then sintered.

19. The method of claim 16, wherein the porous anode body and the metallic PVD layer are sintered in an inert, vacuum, or reducing environment.

20. The method of claim 16, wherein the porous anode body has a thickness ranging from about 100 micrometers to about 400 micrometers.

21. The method of claim 16, further comprising coating the solid electrolytic capacitor with an insulating resin, wherein at least a portion of the anode termination and a portion of the cathode termination are exposed and free of the coating.

* * * * *